(12) United States Patent
Daly et al.

(10) Patent No.: US 11,437,045 B1
(45) Date of Patent: Sep. 6, 2022

(54) VIRTUAL ASSISTANT TECHNOLOGY

(71) Applicant: United Services Automobile Association (USAA), San Antonio, TX (US)

(72) Inventors: Scott Evan Daly, San Antonio, TX (US); Robert Hugh Newman, II, San Antonio, TX (US); Kori Rochelle Newman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 76 days.

(21) Appl. No.: 16/163,817

(22) Filed: Oct. 18, 2018

Related U.S. Application Data (60) Provisional application No. 62/583,676, filed on Nov. 9, 2017.

(51) Int. Cl.
 *G10L 17/22* (2013.01)
 *G10L 25/48* (2013.01)
 *G10L 17/04* (2013.01)
 *H04M 3/51* (2006.01)

(52) U.S. Cl.
 CPC .............. *G10L 17/22* (2013.01); *G10L 17/04* (2013.01); *G10L 25/48* (2013.01); *H04M 3/5183* (2013.01)

(58) Field of Classification Search
 CPC ......... G10L 21/00; G10L 25/48; G10L 17/04; G10L 17/22; H04M 3/5183; G06F 40/279; H04L 67/025; H04L 63/0892
 USPC ........................................................ 704/275
 See application file for complete search history.

(56) References Cited

U.S. PATENT DOCUMENTS

| | | | | |
|---|---|---|---|---|
| 9,848,082 | B1* | 12/2017 | Lillard | H04M 3/53341 |
| 2010/0087169 | A1* | 4/2010 | Lin | G06Q 10/107 |
| | | | | 455/412.1 |
| 2010/0114822 | A1* | 5/2010 | Pollock | H04L 67/75 |
| | | | | 715/205 |
| 2013/0262114 | A1* | 10/2013 | Brockett | G10L 15/22 |
| | | | | 704/E15.005 |
| 2015/0066479 | A1* | 3/2015 | Pasupalak | G06F 16/90332 |
| | | | | 704/9 |
| 2015/0304492 | A1* | 10/2015 | Eyeson | H04M 3/5175 |
| | | | | 379/265.1 |
| 2015/0365448 | A1* | 12/2015 | Stifelman | H04L 65/403 |
| | | | | 709/204 |
| 2016/0179323 | A1* | 6/2016 | Kashi | G06F 16/29 |
| | | | | 715/708 |
| 2016/0219142 | A1* | 7/2016 | Brown | H04W 68/005 |
| 2017/0331824 | A1* | 11/2017 | Pender | H04L 63/0892 |
| 2018/0165691 | A1* | 6/2018 | Heater | G06F 40/205 |
| 2018/0167505 | A1* | 6/2018 | Bird | H04M 3/5175 |
| 2018/0234479 | A1* | 8/2018 | Lilienthal | H04L 67/025 |
| 2018/0314532 | A1* | 11/2018 | Badr | G06F 40/279 |

* cited by examiner

*Primary Examiner* — Michael Colucci
(74) *Attorney, Agent, or Firm* — Fish & Richardson P.C.

(57) ABSTRACT

System, methods, and computer readable media can be used to create a virtual assistant. One of the methods includes receiving audio from a conversation between two parties while the conversation is occurring. The method includes generating a partial transcript of the conversation. The method includes identifying topics based on the partial transcript. The method includes presenting a user interface element based on the identified topic.

15 Claims, 6 Drawing Sheets

VIRTUAL ASSISTANT TECHNOLOGY

CROSS-REFERENCE TO RELATED APPLICATION

This application claims priority under 35 U.S.C. § 119 to U.S. Application Ser. No. 62/583,676, filed on Nov. 9, 2017, and entitled "Virtual Assistant Technology," the entire contents of which is incorporated by reference herein.

BACKGROUND

A call center is a centralized office used for receiving or transmitting a large volume of requests by telephone. An inbound call center is operated by a company to administer incoming product support or information inquiries from consumers.

In a virtual call center model, agents connect to the vendor's equipment through traditional telephone lines, or over voice over the Internet Protocol (VOIP). Calls to and from prospects or contacts originate from or terminate at the vendor's data center, rather than at the call center operator's premises. The vendor's telephony equipment then connects the calls to the call center operator's agents.

An organization may use any number of computing systems, communications networks, data storage devices, or other types of systems to provide service to individuals. An organization may also employ service representatives that use the various systems to assist individuals in service sessions that are conducted over the telephone, in a video conference, through text chat sessions, in person, and/or over other communication channels. Organizations may strive to provide an efficient and productive service interaction between service representatives and the individuals being serviced, while maintaining an appropriate quality level for the service provided by service representatives.

SUMMARY

In general, innovative aspects of the subject matter described in this specification can be embodied in methods that includes actions of receiving audio from a conversation between two parties while the conversation is occurring. The methods include the act of generating a partial transcript of the conversation. The methods include the act of identifying topics based on the partial transcript. The method also includes the act of presenting a user interface element based on the identified topic.

Implementations can optionally include one or more of the following features. Identifying topics may be based on the partial transcript includes providing the partial transcript to a learning machine. The identified topics may have a score indicative of the topics relevance to the conversation. The user interface elements may be associated with a distinct identified topic and presented on the user interface in a separate area. Selecting one of the user interface elements may cause an application associated with the user interface to navigate to a second user interface associated with the topic. The methods may include the act of updating the user interface elements based on a continuing conversation between the two parties.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following advantages.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

A virtual assistant is a software agent that can perform tasks or services for an individual. In general, virtual assistants may work through text, voice, images, or any other method of communication. Some virtual assistants can use natural language processing (NLP) to match user text or voice input to executable commands. (for example, the AMAZON ECHO).

A virtual assistant can be integrated into a call center application in order to assist a service representative to provide service to a customer. A customer may contact a service representative using a telephone or other communication device. In some scenarios, the customer may be connecting to the service representative using voice over the Internet Protocol (VOIP). VOIP generally refers to a group of technologies that enable and support the delivery of voice communications over Internet Protocol (IP) networks, such as the Internet.

The customer may contact a call center, represented by the server. The call center may connect the customer to a service representative. The service representative may be located at the call center or may be located in a remote location and connecting to the call center using IP technologies. For example, the service representative may connect to the call center using a portal application.

Communication between the customer and the service representative may pass through and be processed by the server. The server may includes processes that act as a virtual assistant for the service representative.

Figure 1:
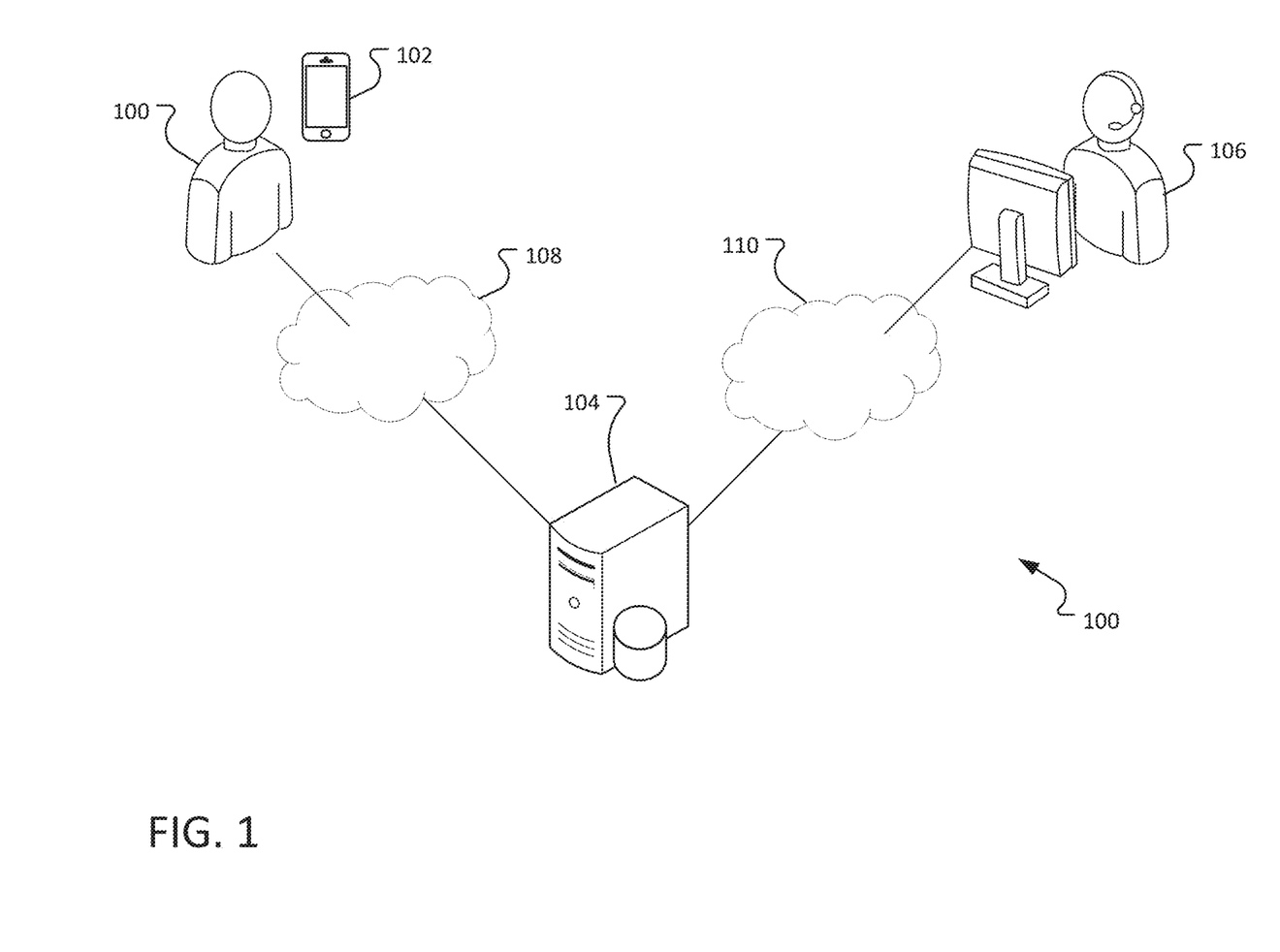
FIG. 1 illustrates a communication between a customer and a customer service representative.

FIG. 1 illustrates a communication between a customer and a customer service representative. Generally, a customer 100 contacts a customer service representative 106 using a telephone 102 or other communication device. For example, the customer 100 may dial a customer service telephone number and may be routed to the customer service representative 106.

The customer 100 and the customer service representative 106 may communicating with a communication path at includes, at least in part, a VOIP connection. The communications from the customer are received over a network 108 by a server 104, the server 104 sends the communication over a network 110 to the customer service representative 106.

In some implementations, the server 104 may act as a routing system that routes communications between the customer 100 and the customer service representative 106. In some implementations, the server 104 may be listening to an established communication channel between the customer 100 and the customer service representative 106.

Figure 2:
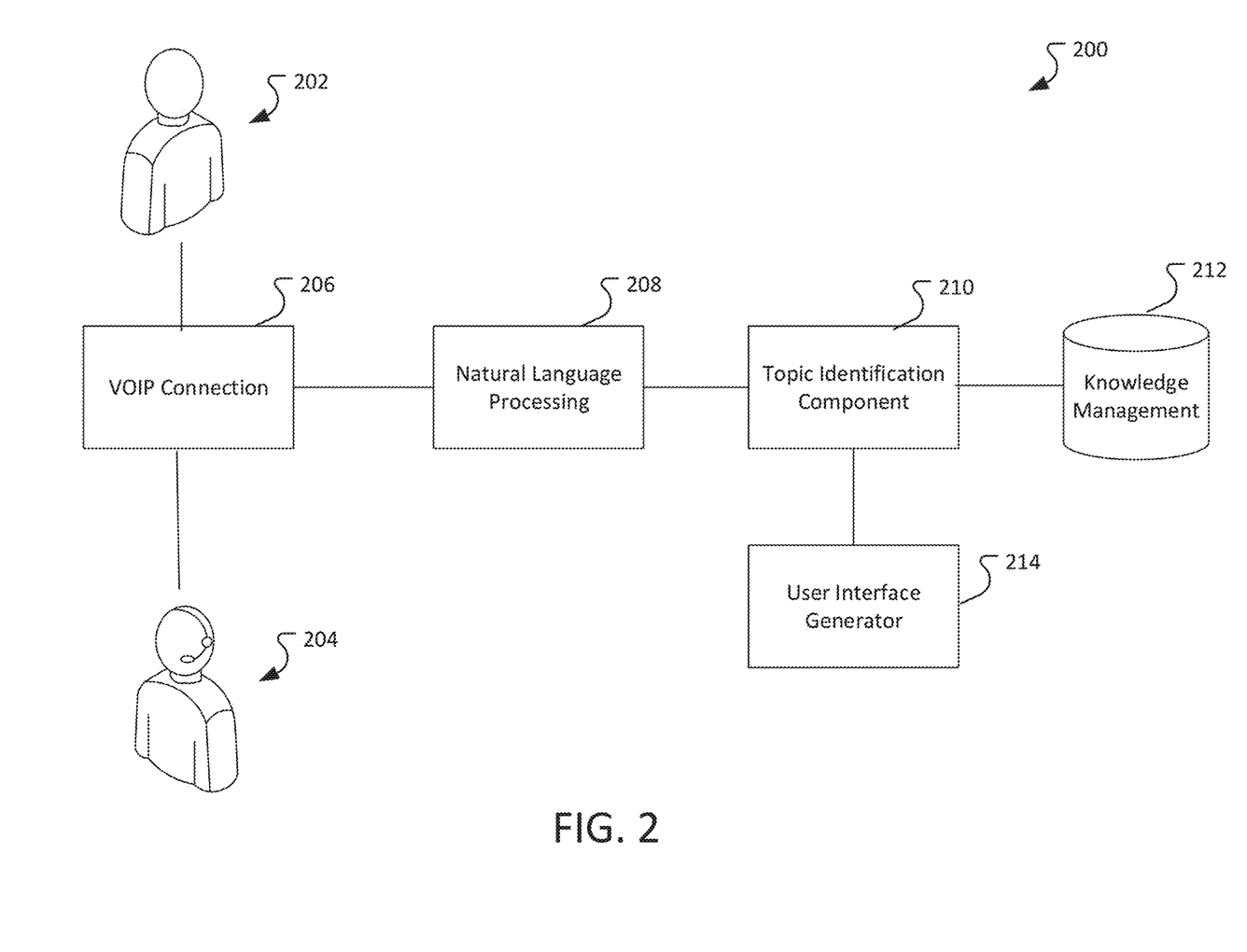
FIG. 2 illustrates an example of the processes of a server that act as a virtual assistant for a service representative.

FIG. 2 illustrates an example of processing components that act as a virtual assistant for a service representative 204. In this example, when the customer 202 speaks with the customer service representative, the communication pass through a VOIP connection 206. A process on a server performs natural language processing 208 on the audio. Natural language processing can include speech recognition. In some implementations, the natural language processing component may make a transcription of the conversation. Natural language can also includes processes that interpret the spoken language and attempt to derive meaning. In some implementations, the conversation between the customer and the customer service operator may not be processed when the phone is muted and/or the phone is on hold.

A topic identification component 210 can take information from the natural language processor and identify topics that may be relevant to the communication between the customer and the service representative. In some implementations, identifying topics can include listening for particular keywords that are indicative of an intent by the user. The topic identification component may identify keywords associated with the business of the company that manages the call center. For example, for a bank, the topic identification system may listen for keywords such as loan, payment, checking, savings, deposit, transfer, etc. For an insurance company the topic identification component may listen for words such as claim, auto, car, vehicle, accident, damage, loss, etc. Some keywords may be relevant in conjunction with other words, for example, when analyzing the phrase, "transfer from savings to checking", the topic identification system may recognize the "savings" and "checking" modify the verb "transfer". The keywords may be stored or associated with information topics in a knowledge management system 212.

Other keywords can include, for example, words that are associated with the customer's profile, such as move, address, telephone number, and e-mail address.

In some implementations, the topic identification system may user machine learning techniques to identify topics of interest. In these implementations, the topic identification system may not be listening for particular keywords, but may instead provide the conversation or a portion of the conversation to a trained learning machine. The trained learning machine may user a trained model that accepts the contents of the conversation or portions of the conversation as inputs and provides potential topics of interest as outputs.

In general, a learning machine may be trained using a training algorithm. The training algorithm may accept training data, where the training data includes, for example, conversations or portions of conversations as well as a list of curated topics that pertain to the conversation. The training model using the training data to generate a trained learning machine. The trained learning machine can then accept a conversation of a transcript of a conversation and identify topics of interest. One or more techniques may be implemented for training a learning machine (e.g., a neural network) to determine a level of similarity between fonts. In general, the training employs both sample conversations and curated topics. For the conversation, different types of input data may be used. In one arrangement, each conversation is represented as text. For example, the input data may include a transcription of the conversation. Other types of data may also be input to represent the conversation for training the learning machine. For example, the sound file may be provided directly to the learning machine. Once trained, the trained learning machine may accept a conversation (e.g. either a transcript or an audio clip of the ongoing conversation) and generate a list of topics.

In some implementations, feedback from a service representative about the relevancy of the selected topics can be used to improve the learning machine. For example, if a service representative selects a topic that is indicative that the topic is relevant to the conversation. If the service representative closes or ignores the topic that is indicative that the topic is not relevant to the conversation.

Topics identified by the topic identification component may be associated with particular actions or activities and/or particular information. For example, a topic may be associated with an activity taken by a service representative, such as a transfer of funds, the creation of a contract, the closing of an account, alternatively, the topic may be informational, and may be associated with information that the service representative may provide to the customer.

In some implementations, each identified topic may be associated with a score. The score can be indicative of the virtual assistant's determination as to the likelihood that the topic is relevant to the conversation between the customer and the service representative. Topics that are deemed to be more likely to be relevant may be given a higher score than topics that are less likely to be relevant. In some implementations, a topic may need to have a score above a threshold in order to be identified as a topic.

As an illustrative example, one implementation of the system may assign a score to identified topics, the score may range from 0 to 100. Topics may need to have been identified and have a score above 70 in order for the virtual assistant to identify the topic as relevant.

In some implementations, topics may be identified on a rolling basis, for example, the virtual assistant may identify topics based on the last 30 seconds, minute, two minutes, etc. of the conversation between the customer and the service representative. In these implementations, the score associated with a topic may fluctuate and the conversation continues.

Once the topic is identified, the topic may be provided to a user interface generator 214. The user interface generator may generate user interface components associated with the identified topics. For example, a user interface used by a service representative may include an area where identified topics are presented for their consideration (as described in more detail below.). The area may be configured to accept new information pushed from the user interface generator 214. The user interface element may include, among other things, a statement that briefly identifies the topic (such as a title), a brief description of the topic, and links to other portions of the user interface that can be used to satisfy customer requests related to the topic.

Figure 3:
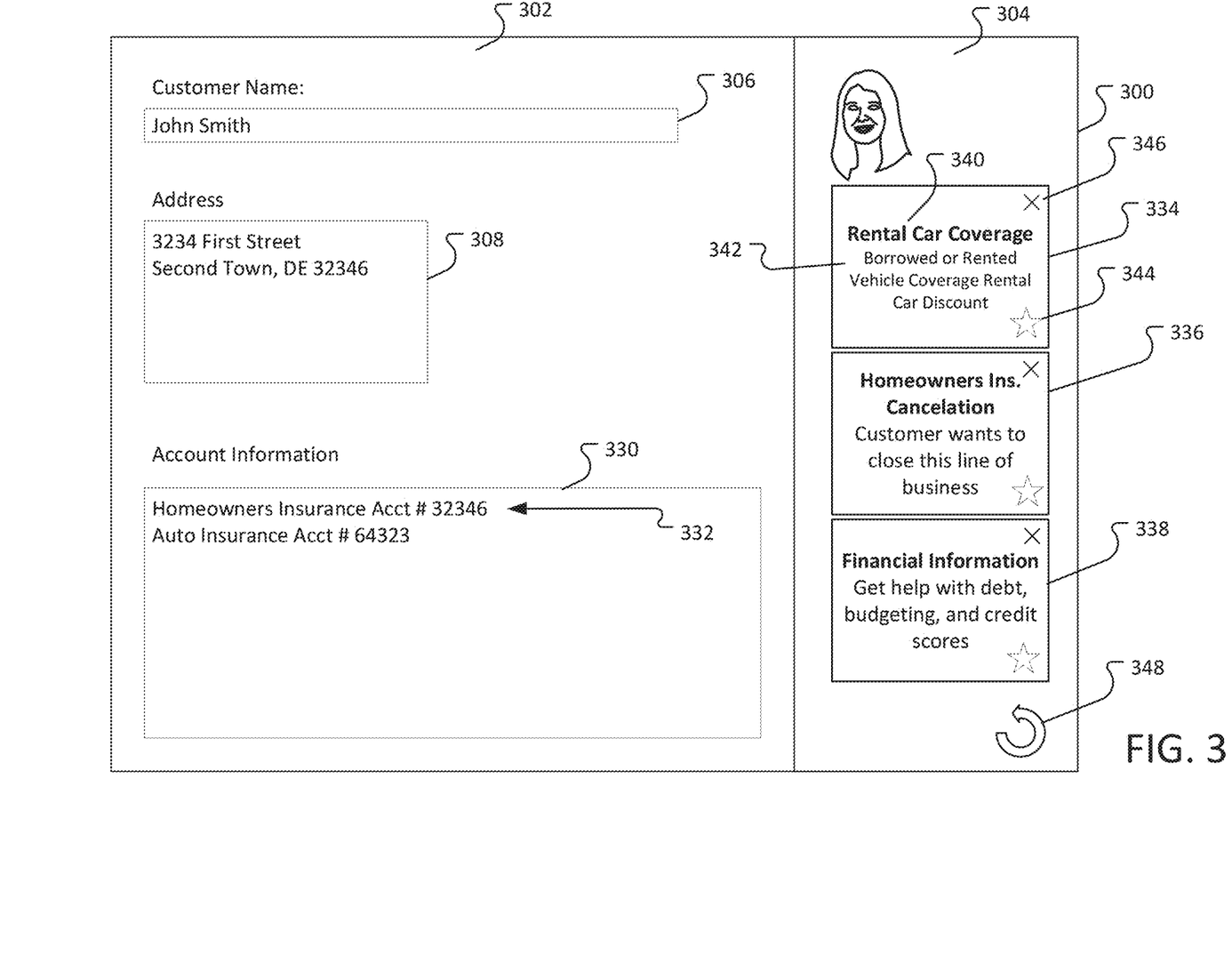
FIG. 3 illustrates an example of a user interface that has been enhanced to use a service representative virtual assistant.

FIG. 3 illustrates an example of a user interface 300 that has been enhanced to use a service representative virtual assistant. The user interface 300 is divided into two sections. The left section 302 includes a portions of a conventional user interface 300 of a customer service representative. This can include information obtained and verified by the service representative. For example, the customer may have provided their account number, telephone number, or name during an automated process causing a customer name field 306, an address field 308, and an account information field 330 to prepopulate with information. The service representative generally confirms this information with the customer during the call. Further, the service section 304 of the user interface 300 includes a virtual assistant area that includes information provided by the virtual assistant.

It should be understood that while this particular example of a user interface is described with the virtual assistant area on the left side of the user interface, the virtual assistant area can be located in other areas as well. For example, the virtual assistant area may be presented as a bar on the top, bottom, or left side of the user interface. The virtual assistant area may also be presented as a floating window that can by moved around the user interface by the service representative. In some implementations, the service representative may place the virtual assistant area wherever they prefer (e.g. left bar, right bar, top bar, bottom bar, or floating window). In some implementations, the location of the virtual assistant area may be determined by the geometry of the remainder (in this example, the left section 302) of the user interface.

As described above, while the service representative and the customer are speaking, the virtual assistant may be listening and processing the contents of the conversation. When the virtual assistant identifies a potential topic, the virtual assistant/user interface generator may generate a card which is presented on the virtual assistant area. Examples of cards include the rental car coverage card 334, the homeowner insurance cancelation card 336 and the financial discussion card 338.

Using the rental car coverage card 334 as an example, a card may include a title 340 or brief description that quickly tells the service representative what the identified topic is. The card may include a more detailed description 342 that can provide additional information in case the service representative finds the title 340 of the card ambiguous. The card can also include a star 344 or other indicator that enables the service representative to cause the card to remain in the virtual assistant area (sometimes referred to as pinning). The card can also include a mechanism for closing the card 346.

In some implementations, the cards may be color-coded or include icons or other images that inform the service representative about the type of card. For example, some cards may link to informative articles that provide answers to questions the customer may have, other cards may cause the service representatives application to navigate to perform certain actions, and still other cards may cause the customer to be transferred to another department or service representative.

In some implementations, the user interface 300 may remove cards from the virtual assistant area. For example, when the user interface generator provides a new card/or and the virtual assistant area is full (that is, there is not sufficient room to add an additional card without requiring scrolling), the user interface 300 may remove the oldest non-pinned card in order to create space for the new card. In some implementations, the user interface 300 may remove the cards that are identified as least relevant based on a score (as described above) in order to make room for a more relevant card.

As discussed above, the service representative may be able to dismiss or delete a card from the virtual assistant area. For example, the service representative may close a card or slide it off the screen. The service representative may also be able to reorder the cards in the virtual assistant area. The virtual assistant area may include an undo button 348 where the service representative may call the card back to the screen, or undo any other recent action taken within the virtual assistant area.

In some implementations, when the service representative completes the conversation with the customer, all of the cards present in the virtual assistant area close/are removed from the virtual assistant area.

Figure 4:
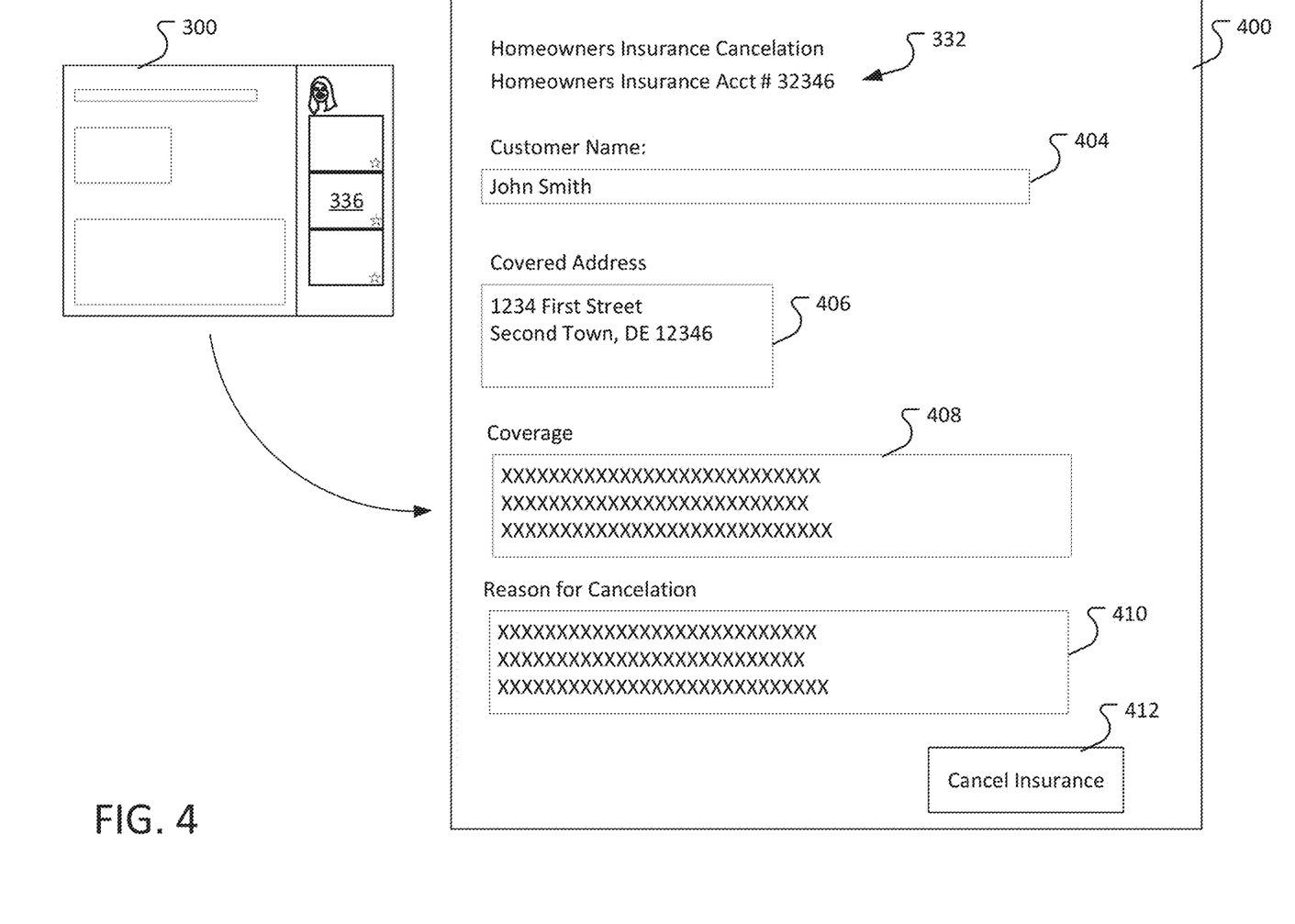
FIG. 4 illustrates an example of navigating an application using a virtual assistant.

FIG. 4 illustrates an example of navigating an application using a virtual assistant. The service representative is presented with the user interface 300 (shown in miniature on FIG. 4 for illustrative purposes). During the conversation with a customer, the service representative may decide that one of the topic cards provided by the virtual assistant is relevant. In this example, the service representative selects the Homeowners Insurance Cancelation card 336. The application links the service representative to a new user interface 400 for homeowner insurance cancelation. The new user interface 400 can be populated with information based on the customer's profile and the conversation. In this example, the user interface is populated with the homeowner's insurance account number 332, the address 406, the current coverage on the address 408, and an area where the service representative can enter the reason for cancelation 410. In some implementations, the virtual assistant may have identified the customer's reason for canceling the homeowners insurance and may populate the field with the reason. The new user interface 400 may also include a user interface element 412 where the service representative can cancel the insurance.

While not shown in FIG. 4, the new user interface 400 may also include a virtual assistant area that may present topic cards to the service representative.

Figure 5:
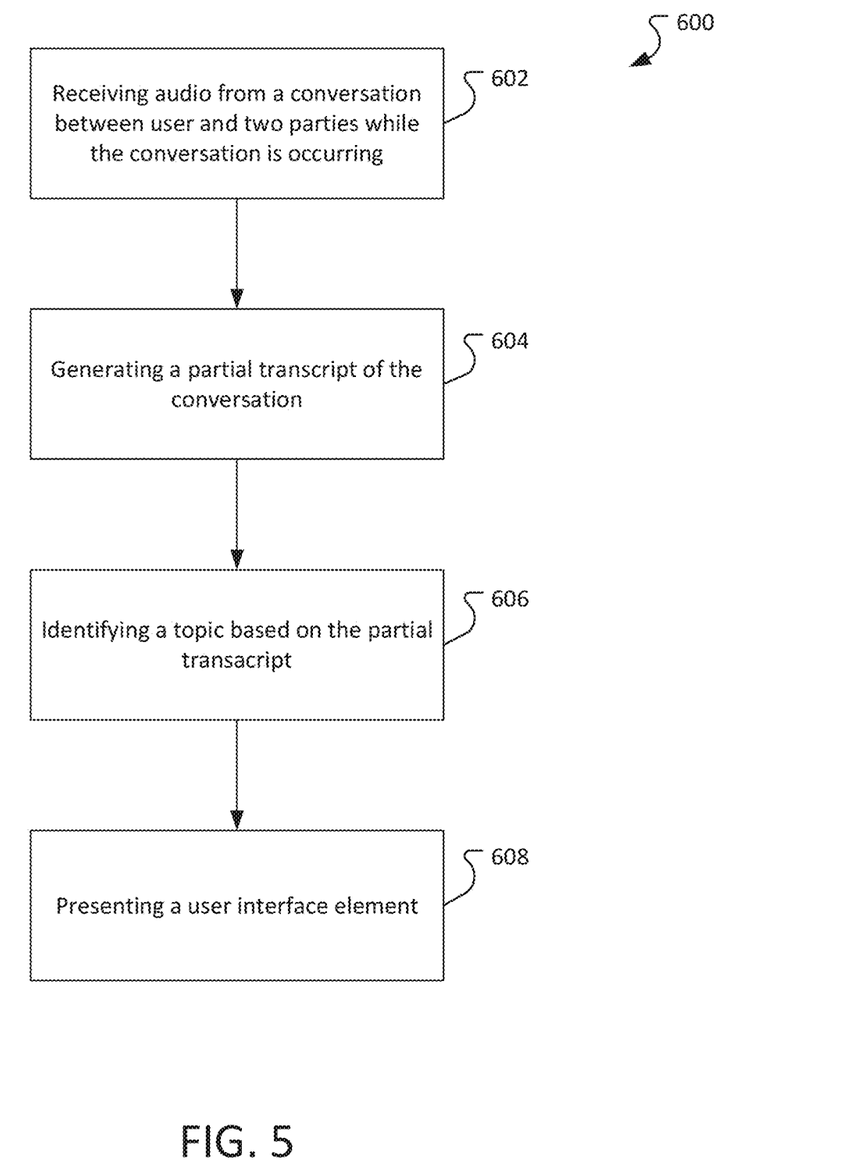
FIG. 5 is a flowchart of an example process for using a virtual assistant.

FIG. 5 is a flowchart of an example process 500 for using a virtual assistant.

The process 500 receives 502 audio from a conversation between two parties while the conversation is occurring.

The process 500 generates 504 a partial transcript of the conversation.

The process 500 identifies 506 topics based on the partial transcript.

The process 500 presents 508 a user interface element based on the identified topic.

Figure 6:
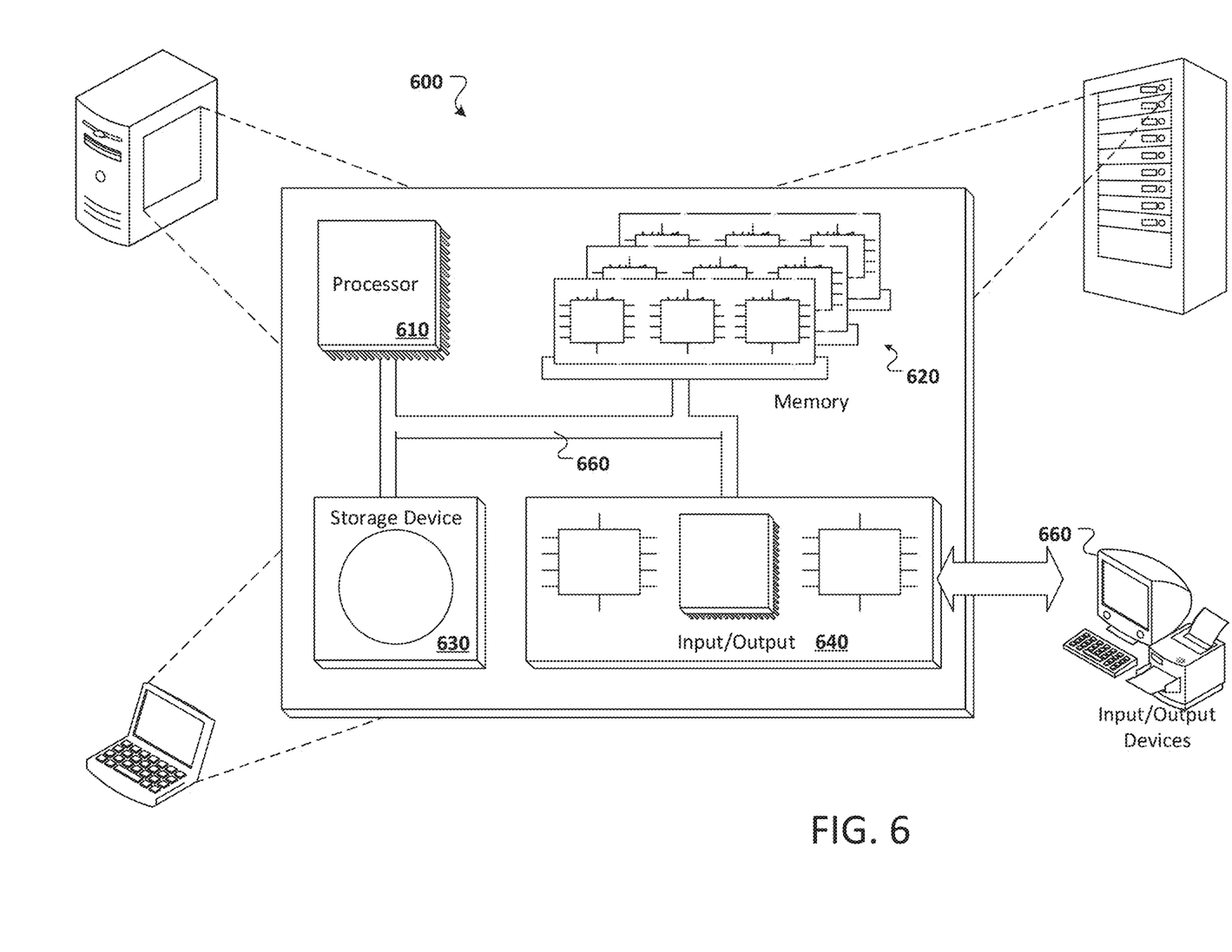
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. The system 600 may include one or more processors 610, a memory 620, one or more storage devices 630, and one or more input/output (I/O) devices 650 controllable through one or more I/O interfaces 640. The various components 610, 620, 630, or 640 may be interconnected through at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more networks using any network protocol.

Computing devices of the system 600 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
    connecting, by the at least one processor, a call between a user device of a customer and a user device of a service representative of an organization;
    receiving, by the at least one processor, audio from a conversation between the customer and the service representative during the call and while the conversation is occurring;
    generating, by the at least one processor, a partial transcript of the conversation based on the audio;
    identifying, by the at least one processor, a plurality of topics based on the partial transcript, wherein the plurality of topics comprises at least one of:
        a first action comprising transferring, by the service representative, funds to an account held by the customer at the organization,
        a second action comprising creating, by the service representative, a contract with respect to the account held by the customer at the organization, or
        a third action comprising closing, by the service representative, the account held by the customer at the organization;
    causing, by the at least one processor, a first user interface to be presented on the user device of the service representative, the first user interface comprising a plurality of first user interface (UI) elements, each of the first UI elements representing one or more of the identified topics;
    receiving, by the at least one processor, first selection data specifying a selection of one of the plurality of first UI elements by the service representative using the first user interface, wherein the selected first UI element represents a first topic of the identified topics;
    responsive to receiving the first selection data, causing, by the at least one processor, a second user interface to be presented on the user device of the service representative, wherein the second user interface comprises:
        account data regarding the account held by the customer at the organization of the service representative, wherein the account data comprises at least one of an identifier of the account or an address of the customer, and
        a second UI element representing the action corresponding to the selected first UI element; receiving, by the at least one processor, second selection data specifying a selection of the second UI element by the service representative using the second user interface; and
    responsive to receiving the second selection data, causing, by the at least one processor, the action corresponding to the selected first UI element to be performed with respect to the account.

2. The computer-implemented method of claim 1, wherein identifying the plurality of topics based on the partial transcript includes providing the partial transcript to a learning machine.

3. The computer-implemented method of claim 1, wherein the identified topics have a score indicative of the topics relevance to the conversation.

4. The computer-implemented method of claim 1, wherein the first user interface elements are each associated with a distinct identified topic and presented on the first user interface in a separate area.

5. The computer-implemented method of claim 1, further comprising updating the first user interface elements based on a continuing conversation between the service representative and the customer.

6. A system, comprising:
    at least one processor; and
    a memory communicatively coupled to the at least one processor, the memory storing instructions which, when executed by the at least one processor, cause the at least one processor to perform operations comprising:
        connecting a call between a user device of a customer and a user device of a service representative of an organization;
        receiving audio from a conversation between the customer and the service representative during the call and while the conversation is occurring;
        generating a partial transcript of the conversation based on the audio;
        identifying a plurality of topics based on the partial transcript, wherein the plurality of topics comprises at least one of:
            a first action comprising transferring, by the service representative, funds to an account held by the customer at the organization,
            a second action comprising creating, by the service representative, a contract with respect to the account held by the customer at the organization, or
            a third action comprising closing, by the service representative, the account held by the customer at the organization;
        causing a first user interface to be presented on the user device of the service representative, the first user interface comprising a plurality of first user interface (UI) elements, each of the first UI elements representing one or more of the identified topics;
        receiving first selection data specifying a selection of one of the plurality of first UI elements by the service representative using the first user interface, wherein the selected first UI element represents a first topic of the identified topics;
        responsive to receiving the first selection data, causing a second user interface to be presented on the user device of the service representative, wherein the second user interface comprises:
            account data regarding the account held by the customer at the organization of the service representative, wherein the account data comprises at least one of an identifier of the account or an address of the customer, and a second UI element representing the action corresponding to the selected first UI element; receiving second selection data specifying a selection of the second UI element by the service representative using the second user interface; and responsive to receiving the second selection data, causing the action corresponding to the selected first UI element to be performed with respect to the account.

7. The system of claim 6, wherein identifying the plurality of topics based on the partial transcript includes providing the partial transcript to a learning machine.

8. The system of claim 6, wherein the identified topics have a score indicative of the topics relevance to the conversation.

9. The system of claim 6, wherein the first user interface elements are each associated with a distinct identified topic and presented on the first user interface in a separate area.

10. The system of claim 6, further comprising updating the first user interface elements based on a continuing conversation between the service representative and the customer.

11. One or more non-transitory computer-readable media storing instructions which, when executed by at least one processor, cause the at least one processor to perform operations comprising:

connecting a call between a user device of a customer and a user device of a service representative of an organization;

receiving audio from a conversation between the customer and the service representative during the call while the conversation is occurring;

generating a partial transcript of the conversation based on the audio;

identifying a plurality of topics based on the partial transcript, wherein the plurality of topics comprises at least one of:

a first action comprising transferring, by the service representative, funds to an account held by the customer at the organization, a second action comprising creating, by the service representative, a contract with respect to the account held by the customer at the organization, or a third action comprising closing, by the service representative, the account held by the customer at the organization;

causing a first user interface to be presented on the user device of the service representative, the first user interface comprising a plurality of first user interface (UI) elements, each of the first UI elements representing one or more of the identified topics;

receiving first selection data specifying a selection of one the plurality of first UI elements by the service representative using the first user interface, wherein the selected first UI element represents a first topic of the identified topics;

responsive to receiving the first selection data, causing a second user interface to be presented on the user device of the service representative, wherein the second user interface comprises:

account data regarding the account held by the customer at the organization of the service representative, wherein the account data comprises at least one of an identifier of the account or an address of the customer, and a second UI element representing the action corresponding to the selected first UI element; receiving second selection data specifying a selection of the second UI element by the service representative using the second user interface; and responsive to receiving the second selection data, causing the action corresponding to the selected first UI element to be performed with respect to the account.

12. The one or more non-transitory computer-readable media of claim 11, wherein identifying the plurality of topics based on the partial transcript includes providing the partial transcript to a learning machine.

13. The one or more non-transitory computer-readable media of claim 11, wherein the identified topics have a score indicative of the topics relevance to the conversation.

14. The one or more non-transitory computer-readable media of claim 11, wherein the first user interface elements are each associated with a distinct identified topic and presented on the first user interface in a separate area.

15. The one or more non-transitory computer-readable media of claim 11, further comprising updating the first user interface elements based on a continuing conversation between the service representative and the customer.

\* \* \* \* \*